(12) United States Patent
Schneider et al.

(10) Patent No.: US 10,518,977 B2
(45) Date of Patent: Dec. 31, 2019

(54) BELT ATTACHMENT AND SYSTEM

(71) Applicant: Natel Energy, Inc., Alameda, CA (US)

(72) Inventors: Abraham D. Schneider, San Francisco, CA (US); Erick M. Davidson, Oakland, CA (US)

(73) Assignee: Natel Energy, Inc., Alameda, CA (US)

( * ) Notice: Subject to any disclaimer, the term of this patent is extended or adjusted under 35 U.S.C. 154(b) by 0 days.

(21) Appl. No.: 15/912,064

(22) Filed: Mar. 5, 2018

(65) Prior Publication Data
US 2018/0194564 A1 Jul. 12, 2018

Related U.S. Application Data

(63) Continuation of application No. 15/001,686, filed on Jan. 20, 2016, now Pat. No. 9,908,709, which is a continuation of application No. 14/661,659, filed on Mar. 18, 2015, now Pat. No. 9,248,970.

(60) Provisional application No. 61/977,207, filed on Apr. 9, 2014.

(51) Int. Cl.
| | |
|---|---|
| *B65G 17/42* | (2006.01) |
| *B65G 23/06* | (2006.01) |
| *B65G 17/12* | (2006.01) |
| *B65G 17/30* | (2006.01) |
| *B65G 15/52* | (2006.01) |
| *B65G 37/00* | (2006.01) |
| *B65G 17/36* | (2006.01) |
| *B65G 17/14* | (2006.01) |

(52) U.S. Cl.
CPC .............. *B65G 17/42* (2013.01); *B65G 15/52* (2013.01); *B65G 17/12* (2013.01); *B65G 17/126* (2013.01); *B65G 17/30* (2013.01); *B65G 17/36* (2013.01); *B65G 37/005* (2013.01); *B65G 17/14* (2013.01)

(58) Field of Classification Search
None
See application file for complete search history.

(56) References Cited

U.S. PATENT DOCUMENTS

| | | |
|---|---|---|
| 2,126,704 A | 8/1938 | Schmidt |
| 2,752,766 A | 7/1956 | Wildhaber |
| 2,823,789 A | 2/1958 | Henning |
| 2,916,136 A | 12/1959 | Combs |

(Continued)

FOREIGN PATENT DOCUMENTS

| | | |
|---|---|---|
| CN | 101711291 A | 5/2010 |
| DE | 27 32 932 A1 | 2/1978 |

(Continued)

OTHER PUBLICATIONS

European International Search Report for European Patent Appl. No. PCT/US2015/024496, 2 pages, dated Jul. 13, 2015.

*Primary Examiner* — Kavel Singh
(74) *Attorney, Agent, or Firm* — Sterne, Kessler, Goldstein & Fox P.L.L.C.

(57) ABSTRACT

Disclosed herein is a belt assembly including a flexible belt with an improved belt attachment. The belt attachment includes two crossbars spaced along the length of the belt. The crossbars retain bearings that allow predetermined movement in six degrees of freedom. The crossbars are connected by a rigid body that attaches to the bearings. Implements that are attached to the rigid body are simply supported but restrained in pitching rotation.

10 Claims, 11 Drawing Sheets

(56) References Cited

U.S. PATENT DOCUMENTS

| | | | |
|---|---|---|---|
| 3,093,005 A | 6/1963 | Dean | |
| 3,537,571 A | 11/1970 | Wiese | |
| 3,580,388 A | 5/1971 | Resener | |
| 3,659,472 A | 5/1972 | Engels | |
| 3,712,357 A | 1/1973 | Corbett et al. | |
| 3,787,102 A | 1/1974 | Moran | |
| 3,831,358 A | 8/1974 | Marsh et al. | |
| 4,198,875 A | 4/1980 | Schneider | |
| 4,286,827 A | 9/1981 | Peterson et al. | |
| 4,736,832 A | 4/1988 | Rinio | |
| 4,842,127 A | 6/1989 | Zenker | |
| 5,425,679 A | 6/1995 | Utz | |
| 5,529,168 A | 6/1996 | Soriano et al. | |
| 5,626,220 A | 5/1997 | Rieger et al. | |
| 5,738,204 A | 4/1998 | Baumgartner | |
| 5,792,484 A | 8/1998 | Schmidgall | |
| 5,881,863 A | 3/1999 | Borner | |
| 6,053,308 A | 4/2000 | Vogrig et al. | |
| 6,321,904 B1 | 11/2001 | Mitchell | |
| 6,439,376 B1 | 8/2002 | Spatafora et al. | |
| 6,615,974 B2 | 9/2003 | Scholz | |
| 6,896,125 B2 * | 5/2005 | Webster | B65G 15/52 |
| | | | 198/844.2 |
| 7,051,879 B2 | 5/2006 | Ramet | |
| 7,131,532 B2 | 11/2006 | Webster et al. | |
| 7,494,006 B2 * | 2/2009 | Knott | B65G 17/08 |
| | | | 198/850 |
| 2008/0010785 A1 | 1/2008 | Richardson et al. | |

FOREIGN PATENT DOCUMENTS

| | | |
|---|---|---|
| DE | 20 2011 002 846 U1 | 6/2011 |
| DE | 10 2011 011 557 B3 | 8/2012 |
| DE | 10 2012 012 204 A1 | 12/2013 |
| EP | 0 080 648 A1 | 6/1983 |
| EP | 1 985 732 A1 | 10/2008 |
| FR | 2 462 367 A1 | 2/1983 |
| JP | S 63-097515 | 4/1988 |
| JP | 2000-314440 | 11/2000 |
| WO | WO 01 04699 A1 | 1/2001 |

\* cited by examiner

BELT ATTACHMENT AND SYSTEM

STATEMENT REGARDING FEDERALLY SPONSORED RESEARCH OR DEVELOPMENT

This invention was made with Government support under grant Award Number DE-EE0005412 awarded by the U.S. Department of Energy. The Government has certain rights in the invention.

BACKGROUND

This application relates to belt attachments, specifically to an improved system for belt attachments that sustain large loads and very high cycle fatigue. Typical applications include conveyors, bucket excavators, elevators, vertical lifts, and similar machines used to transfer a load from one location to another. Belt attachment systems may also be used in power conversion machines, such as in hydropower or wind power devices, where it is desired that large loads are passed from an attached body to a belt that then drives a generator. However, currently available belt attachment systems lack the ability to withstand large loads and high cycle fatigue.

Chains have been used in place of belts for some systems, but chains tend to be heavy, consist of many moving parts, and suffer from high wear rates and high maintenance cost. Due to these issues, chain-based systems often demand frequent maintenance. Chain systems also require complex systems to maintain chain tension as the system wears.

Belt systems have advantages over chain systems including relative simplicity, lower maintenance requirements, and reduced noise. Belt attachments can be used on a single belt with attached bodies as is typical of conveyor systems. In this case, loads tend to be light relative to the size and power rating of the belt and loads are typically transferred along the flat portion of the belt. Belt attachments can also be used to support attached bodies between a plurality of belts such as in vertical lifts. In this case and with heavier loads, rigid attachments to the belt can suffer from bending moment induced stresses resulting in relatively low fatigue lifetimes.

Current methods used to secure a single attachment to a belt are generally unsatisfactory for the transfer of large loads and high fatigue lifetimes. Some common securing methods include fastening (bolts or rivets), gluing, and vulcanizing. Bolts or rivets that, by themselves, secure attachments suffer from low belt fatigue lifetimes by gradually elongating the through holes in the belt. Gluing is a messy process and does not allow the attachment to be removed from the belt. Furthermore, glue degrades and breaks down relatively quickly in operation due to peeling forces as the belt bends around the sprocket. Vulcanizing elastomeric members to a belt requires special tooling and the resulting attachments do not support large loads.

Other methods of belt attachment have been used to address the issue of supporting the attachment as it goes around the sprocket. This is a problem area for many attachment methods because the flat contact area changes to a line contact around the sprocket and is therefore not capable of supporting a pitching moment. Also, the straight-line distance between two adjacent belt teeth changes around the sprocket, which makes multiple attachment points difficult. Existing solutions either support relatively low loads or suffer from high wear rates.

Different belt attachment systems and different applications require different boundary conditions for connecting an implement to the belt attachment(s). A single belt attachment may need to allow, restrain, or fix six degrees of freedom.

PARTS LIST

100 Belt attachment assembly
101 Belt
102 Crossbar
103 Platform
104 Bearing cap
105 Spring washer stack
106 Fasteners
107 Through belt fasteners
108 Nuts
109 Threaded hole
116 Lift direction
117 Drag direction
118 Side direction
119 Pitching rotation
120 Cocking rotation
121 Rolling rotation
122 Belt surface
123 Tensile member
201 Second spring washer stack
202 Pin
203 inner cylinder
204 Middle cylinder
205 Outer cylinder
206 Washers
207 Belt pocket
208 Hole through belt
209 Bearing cavity
210 Crossbar holes
300 Bearing assembly 301 Belt pitchline
302 Pin center
303 Pin offset
304 First gap
305 Second gap
306 Third gap
307 Fourth gap
308 Ramps
310 Crossbar spacing
311 Pin outer surface
312 Inner cylinder inner surface
313 Inner cylinder outer surface
314 Middle cylinder inner surface
315 Middle cylinder outer surface
316 Outer cylinder inner surface
317 Outer cylinder outer surface
401 Spikes
402 Fastener shank
403 Fastener thread
404 Crossbar to belt interface
501 Rib
700 Belt attachment assembly
800 Belt attachment assembly
801 Elastomeric cylinder
802 Dastomeric bearing
900 Conveyor system
901 Implement
902 Parallel belt assemblies, spaced apart
903 Points of attachment
904 Sprockets or sheaves
905 Linear portion
906 Curved portion
1000 Conveyor system
1001 Implement
1002 Belt assembly
1003 Point of attachment
1010 Belt
1020 Crossbar
1021 Crossbar
1030 Platform
1031 Platform
1040 Bearing cap
1041 Bearing cap
1101 Belt attachment
1103 implement attachment bolts
1105 Payload center of mass
1106 Belt pitch line
1107 Distance between payload center of mass and belt pitch line
1200 Conveyor system
1201 Point of attachment
1202 Belt assembly
1203 Load-bearing implement
1204 Sprocket or sheave
1205 Lifting module
1206 Lifting module
1207 Payload (pallet or other load)
1220 Belt surface
1300 Conveyor system
1301 Load-bearing platform
1302 Belt assembly
1303 Point of attachment
1304 Load angle
2020 Pin
2021 Pin
2030 Inner cylinder
2050 Outer cylinder
2091 Bearing cavity
3020 Pin center
3030 Pin offset
3100 Crossbar spacing

DETAILED DESCRIPTION

Belt attachments are used to connect various implements such as buckets, blades, or rigid platforms to a belt for either driving the implements or using the implements to drive the belt for the generation of power. Depending on the specific application, a single belt attachment can restrain the implement within predetermined limits, or fix the implement with six degrees of freedom. These six degrees of freedom are defined herein.

Figure 1:
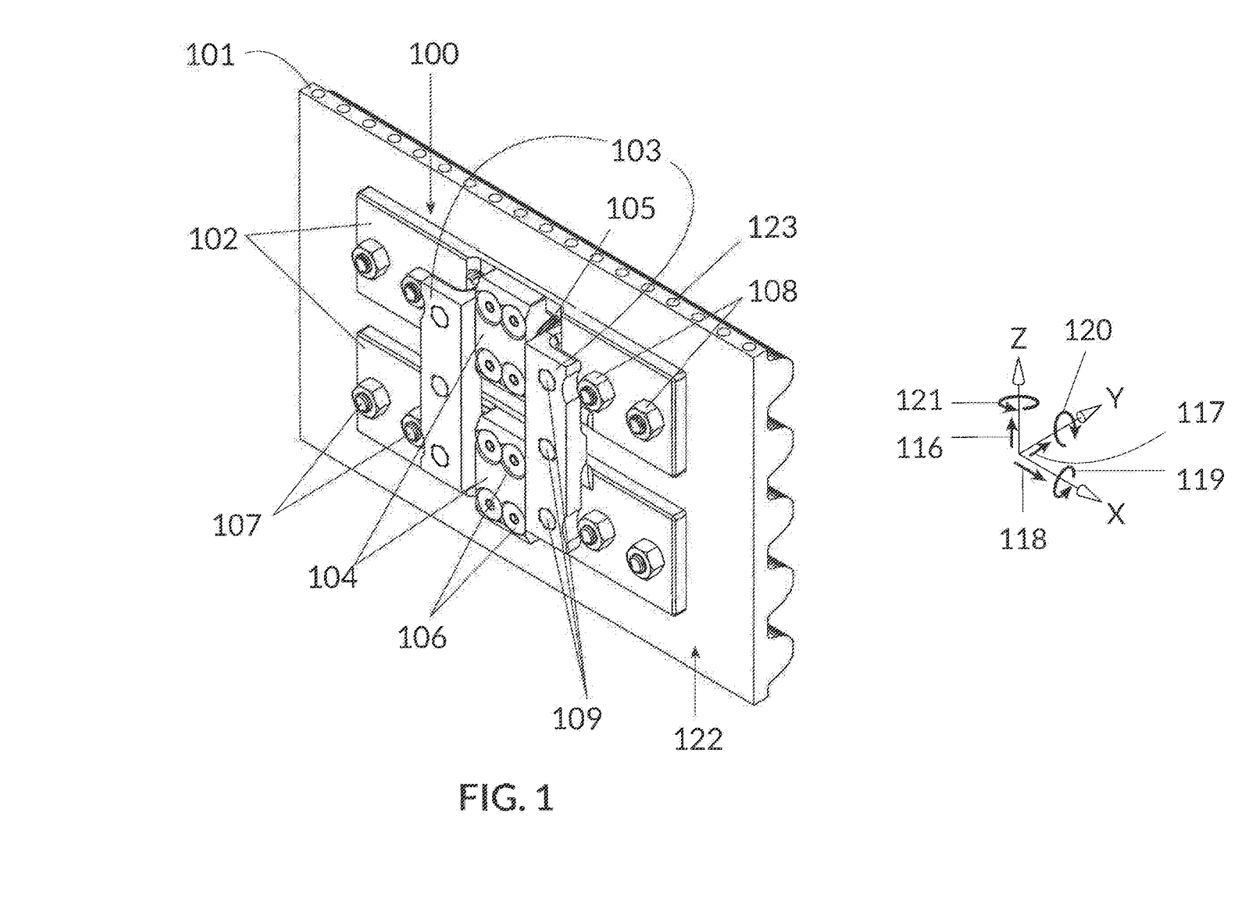
FIG. 1 is an isometric view of a belt attachment in accordance with a first aspect.
Figure 2:
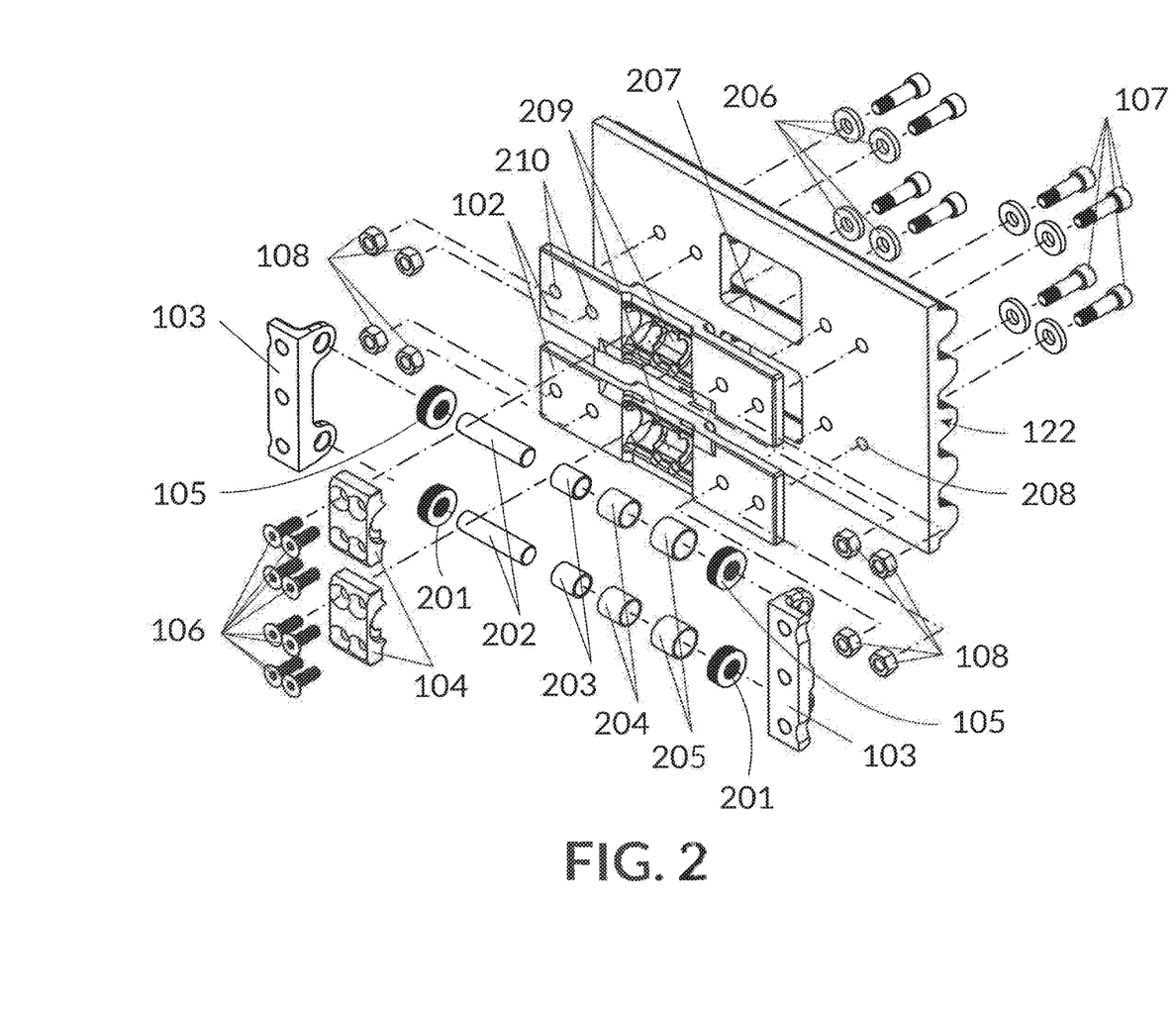
FIG. 2 is an exploded view of the belt attachment shown in FIG. 1.

There are three translational degrees of freedom and three rotational degrees of freedom. As shown in FIG. 1, a load orientated in-line with the travel of the belt, parallel to lift direction 116 (Z-axis) is a "lift load" and will nominally result in a "lift translation." A load orientated perpendicular to the back of the belt, parallel to drag direction 117 (Y-axis) is a "drag load" and will nominally result in a "drag translation." A load orientated transverse to the direction of travel of the belt, i.e. parallel to side direction 118 (X-axis), is a "side load" and can result in a "side translation." A moment that occurs about an axis transverse to the direction of travel of the belt, i.e, a moment about side direction 118 (X-axis), will be termed a "pitching moment" and can result in a "pitching rotation" 119. A moment that occurs about an axis normal to the back of the belt, i.e, a moment about drag direction 117 (Y-axis), will be termed a "cocking moment" and will nominally result in a "cocking rotation" 120. A moment that occurs about an axis in-line with the direction of travel of the belt, i.e. a moment about lift direction 116 (Z-axis), will be termed a "rolling moment" and will nominally result in a "rolling rotation" 121. It is further understood that these directions will travel with and remain relative to the belt regardless of the belt being in a straight or curved section.

These six degrees of freedom should be considered in the design of a successful belt attachment. For example, a pair of parallel belts with a spanning implement can experience large loads in both the lift and drag directions as well as large pitching moments. In this case, it is desirable to have the implement be simply supported in both primary bending directions by restricting the lift translation and drag translation on each belt attachment while allowing for predetermined cocking rotation, rolling rotation, and side translation. At the same time, it is important to resist pitching moments by constraining pitching rotation. Finally, when transferring high loads, a pair of sprockets connected by a cross-shaft will experience windup, which can result in an angular misalignment between sprockets. This effect, combined with manufacturing tolerances, requires the belt attachments to accommodate a small drag translation. Other applications can impose different constraints on the belt attachment.

Belt attachments typically operate in demanding applications that could include high loads and moments, very high cyclic loads over millions of cycles, adverse environments including marine and heavy industry, tight space constraints, or any combinations of the foregoing. In addition, it is desirable that belt attachments operate continuously with little to no maintenance.

In one aspect of the invention shown in FIGS. 1-6, belt attachment 100 can accommodate multiple degrees of freedom and operate in various demanding applications. Belt attachment 100 is designed for applications where it is desired to resist pitching moments of implements. Pitching moments 113 are resisted in this aspect by two belt attachment points in the lift direction 116. These two attachment points are accomplished by attaching two crossbars 102 to a belt 101 using pre-drilled belt through-holes 208 and fastening hardware consisting of fasteners 107, washers 206, and nuts 108. A belt cutout 207 can be provided to accept the recessed bearing cavity 209 on the crossbar 102. The crossbars 102 are preferably positioned at the center of belt teeth so that washers 206 and fastener 107 heads are completely contained within the tooth profile. This allows the belt 101 to travel over a sprocket without modification to the sprocket. In another aspect, crossbars 102 can be positioned at other locations along the lift direction 116 of the belt. In this aspect, sprockets may require grooves to pass the hardware.

Fasteners 107 can have a shank portion 402 and a threaded portion 403. Crossbar holes 210 can preferably be made to have a locational clearance fit with the shank portion 402 of the fasteners 107. Where high cyclic loads are anticipated, the locational clearance fit significantly reduces the stresses in the threaded portion 403 of the fasteners 107. Due to the compliant nature of belts, washers 206 can be used to distribute the fastener load over a larger area and prevent fastener pull-through. Many other types and configurations of fasteners are possible for attaching the crossbars 102 to the belt 101. Examples of different types of fasteners include, but are not limited to, regular bolts and screws with different head shapes, rivets, studs, and shoulder bolts. Examples of different configurations of belt attachment 100 include: using a threaded crossbar 102; securing the fasteners with various types of locknuts, jam-nuts or lock-washers; omitting or using various kinds of washers or spring washers, or any combination of the foregoing.

The belt to which the attachments are affixed may include "timing" or positive drive belts, flat belts, or "V" belts, with or without reinforcing material. The belt may be manufactured of any common belt material, and can include flexible material such as, but not limited to, polyurethane, rubber, or neoprene. The belt may also be combined with reinforcing material such as, but not limited to, steel or stainless steel wire or cable, or fibers such as, but not limited to, Kevlar, carbon, or fiberglass.

Contact between the crossbar 102 and belt 101 can be augmented with substantially pyramidal shaped spikes 401 that can engage belt 101. For belts that are reinforced with tensile members 123 such as steel, Kevlar, glass fiber or carbon fiber, it is desirable to design the spikes 401 to engage the tensile members 123 without cutting through them. The spikes 401 can be patterned around the belt through-holes 208 to fall within the belt area covered by the washers 206, so that belt 101 and tensile members 123 are sandwiched between the washers 206 and crossbars 102, thus ensuring full engagement of the spikes 401.

In applications with high loads such as those corresponding to the maximum rated belt power for a given belt speed and/or very high cycle fatigue endurance on the order of tens of millions of cycles, the spikes 401 have not been observed to slip or fracture. In one aspect, spikes 401 withstood belt attachment loads of 9000N on a belt rated for 250 kW for 100 million load cycles without failure. Spikes 401 can also be placed in additional locations on the underside of the crossbar 102.

As shown in FIGS. 2-6, the bushing roller bearings 300 include a pin 202, an inner cylinder 203, a middle cylinder 204, and an outer cylinder 205, with cylinders 203, 204, 205 disposed concentric to and along the mid-span of the pin 202. For example, pin 202 is contained within an inner area of inner cylinder 203; pin 202 and inner cylinder 203 are contained within an inner area of middle cylinder 204; and pin 202, inner cylinder 203, and middle cylinder 204 are contained within an inner area of outer cylinder 205. The bearing subassembly is comprised of two sets of bushing roller bearings 300 disposed between two platforms 103. It is also possible to use just one cylinder, two cylinders, four cylinders, five cylinders, six cylinders, or more than six cylinders in bushing roller bearings 300. The pins can be press-fit at both ends to the two platforms, or could be connected by brazing, welding, swaging, heading, fasteners, as well as other methods known to those skilled in the art. In one aspect, a sandwiched pair of spring washer stacks 105 and a sandwiched second pair of spring washer stacks 201 can be used.

The bearing subassembly spans the two crossbars 102 and is attached to them so that the outer cylinders 205 of the bearings are sandwiched between a bearing cavity 209 in the crossbar 102 and a mating bearing cavity in a bearing cap 104. The spring washer stacks 105 and 201 can be disposed on the outside of the bearing cavity 209 and adjacent to ribs 501 in the crossbars 102 and matching ribs in the bearing caps 104. The bearing caps 104 are held in contact to the crossbars 102 with fasteners 106 that engage threaded holes in the crossbars 102. The bearing caps 104 and crossbars 102 can also have mating ramps 308 that help align the bearing cavities 209. The ramps 308 can prevent relative movement between the bearing caps 104 and crossbars 102 in the lift direction 116 and can allow the crossbars 102 to sustain higher stresses. Other methods of attaching the bearing caps 104 to the crossbars 102 are acceptable such as rivets, bolts and nuts, brazing, welding, clips, and other methods known to those skilled in the art.

Figure 3:
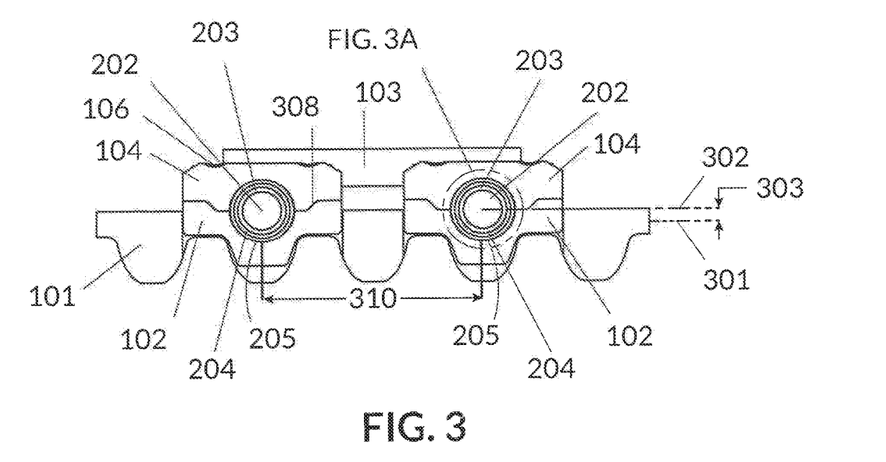
FIG. 3 is a schematic cross sectional view of the belt attachment shown in FIG. 1.
Figure 3A:
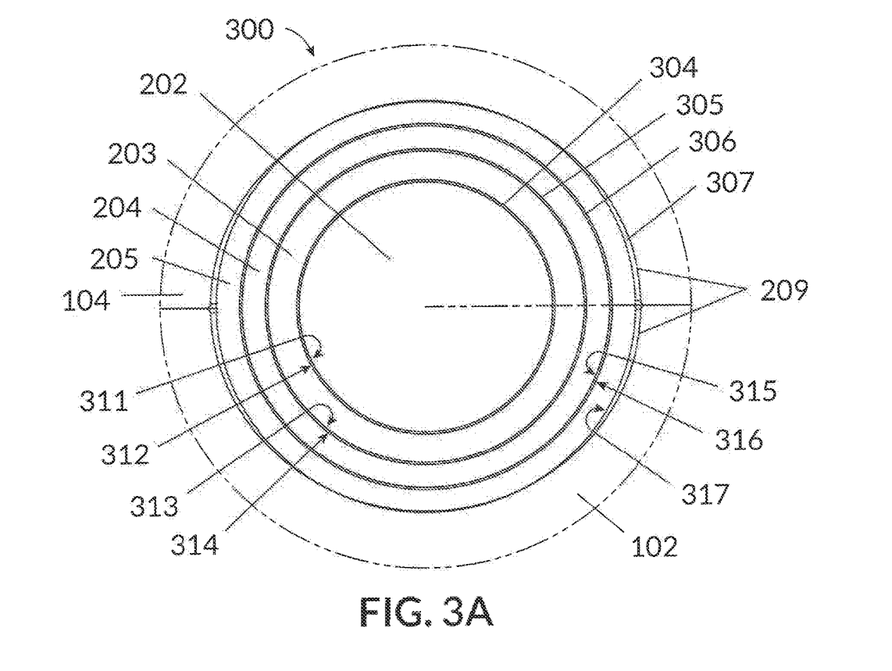
FIG. 3A is a detailed cross sectional view from FIG. 3.
Figure 4:
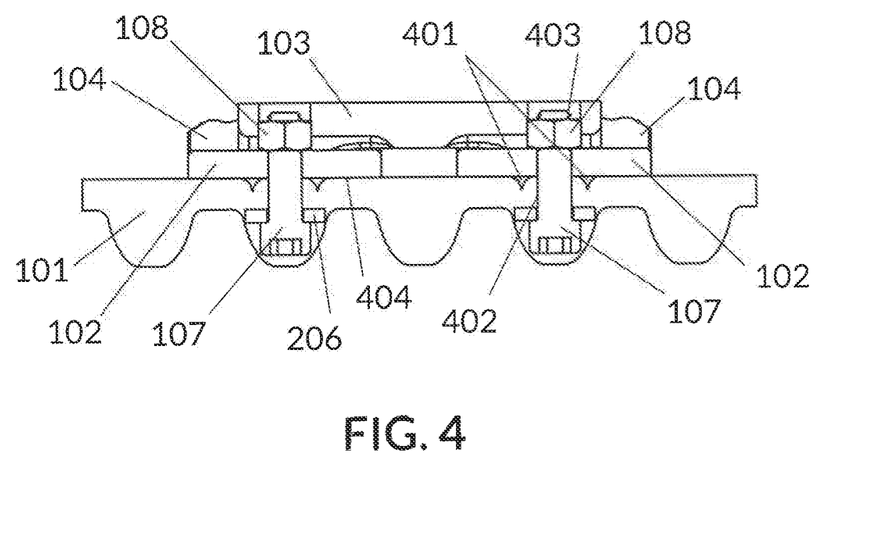
FIG. 4 is a second schematic cross sectional view of the belt attachment shown in FIG. 1.
Figure 5:
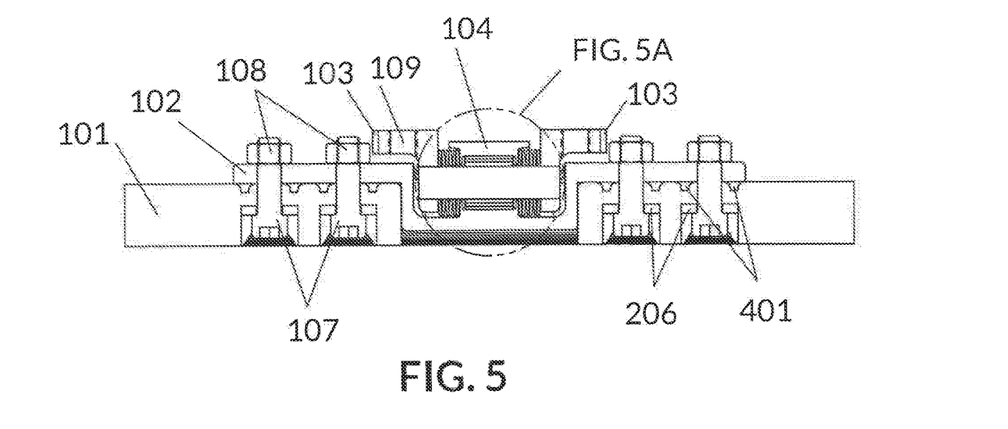
FIG. 5 is a schematic orthogonal cross section view of the belt attachment shown in FIG. 1.
Figure 5A:
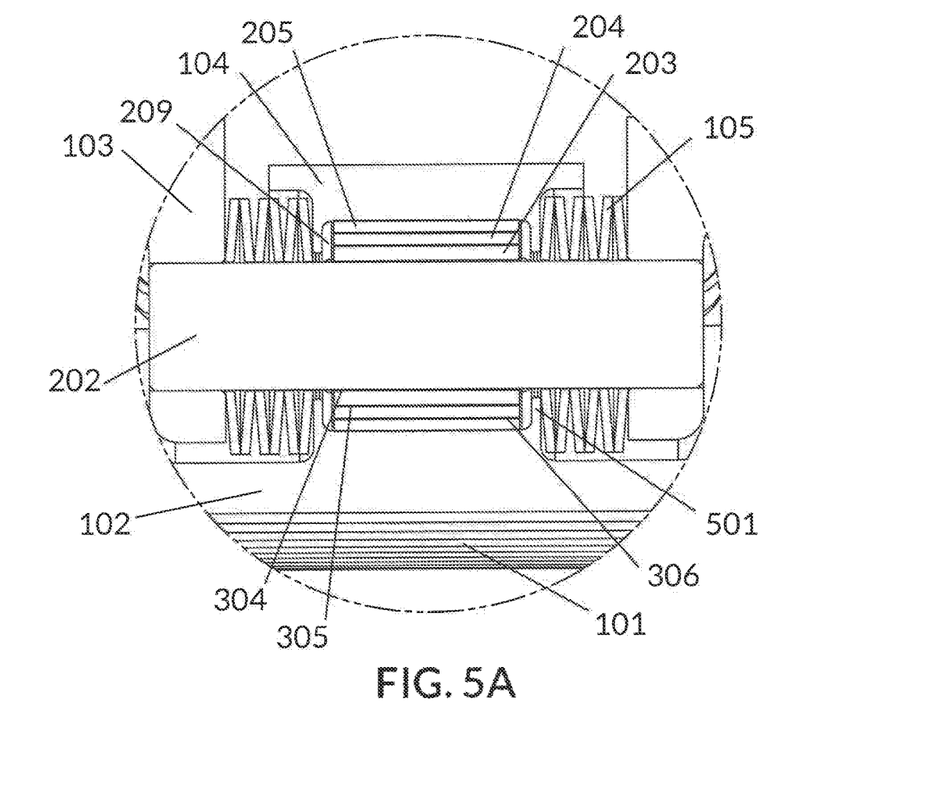
FIG. 5A is a detailed cross sectional view from FIG. 5.
Figure 6:
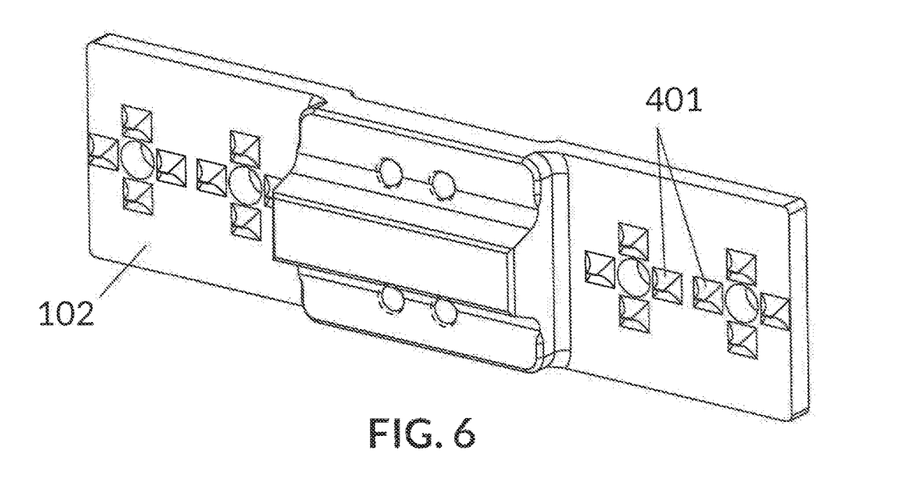
FIG. 6 is a view of a crossbar showing the spike ("crampon") features.

Further detail for bushing roller bearings 300 is shown in FIG. 3A. The three concentric cylinders 203, 204, and 205 are separated from the pin 202 and from one another by three small gaps. Gap 304 is positioned between pin 202 and inner cylinder 203. Gap 305 is positioned between inner cylinder 203 and middle cylinder 204. Gap 306 is positioned between middle cylinder 204 and outer cylinder 205. These gaps ensure slip fits and allow the cylinders 203, 204, and 205 to translate and rotate relative to the pin 202, bearing cavity 209, and one another. In one aspect of the invention, the gaps range in size from approximately 0 mm to approximately 0.5 mm. In another aspect, the gaps range in size from approximately 0.02 mm to approximately 0.3 mm. In a further aspect, the gaps range in size from approximately 0.05 mm to approximately 0.2 mm. The gaps 304, 305, and 306 can also be defined to allow predetermined angles of cocking rotation 120 and rolling rotation 121. For example, if significant cocking rotation 120 or rolling rotation 121 are expected, gaps 304, 305, and 306 could be increased by, for example, increasing the size of the bearing cavity 209 and diameters of cylinders 203, 204, and 205. Increasing the gaps 304, 305, and 306 allows the belt attachment 100 to absorb rotations without transferring cocking moments 114 or rolling moments 115 to the belt 101. In this example, gaps 304, 305, and 306 could also be set to allow predetermined angles of rotation and prevent thrther belt attachment cocking 120 or rolling rotation 121. Bearing cavity 209 is formed by crossbar 102 and bearing cap 104 and is the area between either crossbar 102 or bearing cap 104 and outer cylinder 205. Gap 307 can be positioned in bearing cavity 209 between outer cylinder 205 and either crossbar 102 or bearing cap 104. As shown in FIG. 3A, in one aspect the bearing cavity 209 formed by crossbar 102 and bearing cap 104 is not perfectly circular, but is defined by two tangent arc segments of different radii. This is in contrast to bushing roller bearings that are housed in a circular cavity. In this aspect, gap 307 is therefore not of uniform thickness around the circumference of the bearing 300. The shape of the bearing cavity 209 can thus be designed to allow for different amounts of pin 202 translation in the lift 116 and drag directions 117, and/or to limit cocking rotation 120 and rolling rotation 121 independently. In one aspect of the invention, additional gap thickness is needed in the lift direction 116 to accommodate travel around the sprocket where the straight line distance between the two crossbars 102 changes. In this aspect, it is desirable to keep translation in the drag direction 117 to a minimum to minimize pitch rotation 119. Some translation in the drag direction 117 is required, however, to allow for rolling rotation 121, free moving cylinders, tolerances, and any sprocket misalignment due to windup or tolerances. In another aspect of the invention, it might be desirable to allow a predetermined amount of pitching rotation 119 by increasing the size of the gaps in the drag direction 117.

Figure 14:
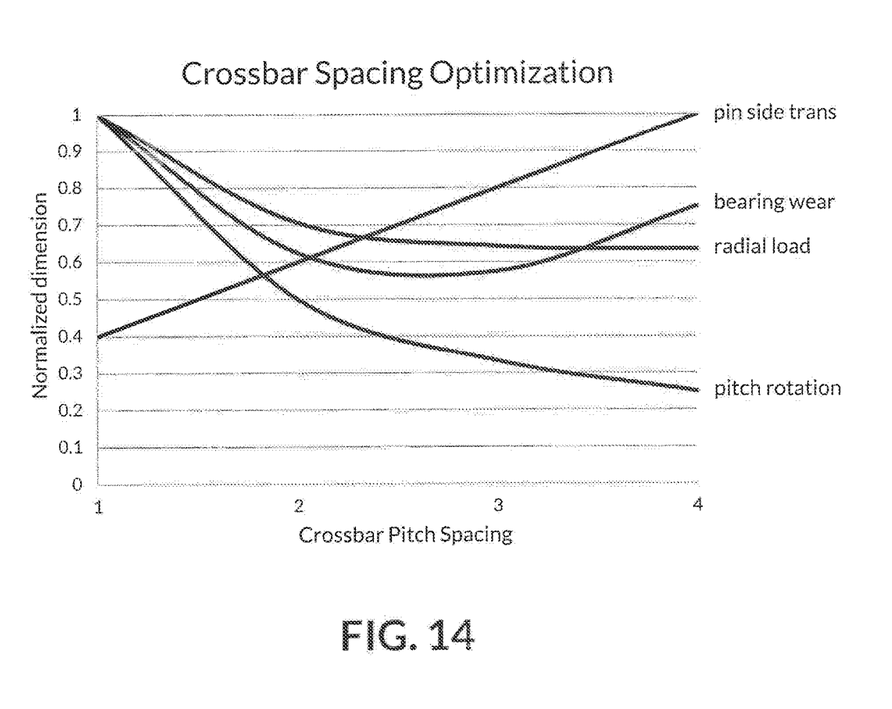
FIG. 14 is a chart of belt attachment design variables versus crossbar pitch spacing.

The crossbar spacing 310 shown in FIG. 3 and depends on several factors. In one aspect, crossbar spacing 310 is two belt pitches, with one pitch being defined as the distance between adjacent belt teeth. For a given pitching moment, placing the crossbars 102 closer together increases the drag loads and therefore total radial loads on the bearings and increases the pitching rotation 119 of the attached implement. However, placing the crossbars 102 closer together also reduces the side translation that each bearing must accommodate for every belt revolution. Bearing wear is a function of bearing load and sliding distance and therefore changes with crossbar spacing. Crossbar spacing 310 can be optimized for any of these variables or for any other variable of importance. A chart illustrating how design variables vary with crossbar pitch spacing is shown in FIG. 14. FIG. 14 applies to one specific aspect of the invention where lift loads, drag loads, pitching moments and corresponding rotations and translations are all present. The variables listed are "pin side trans", "bearing wear", "pitch rotation", and "radial load." "Pin side trans" refers to pin 202 movement in the side direction 118 as a result of cocking rotation 120 and side translation. "Bearing wear" describes the combined rate of wear of the bearing 300 components (pin 202, concentric cylinders 203, 204, and 205, and bearing cavity 209) for a bushing roller bearing configuration. "Pitch rotation" refers to pitching rotation 119 of the platforms 103 or attached implement 901. "Radial load" is the combined bearing radial load due to lift loads, drag loads, and moments. The design variables in the chart are normalized, i,e. each has a maximum value of unity, so that they can easily be compared on a single chart. In this aspect of the invention, the maximum "pin side trans" is 2.5 mm, the maximum "bearing wear" is 0.08 mm^3/hr, the maximum "pitch rotation" is 1.2 degrees, and the maximum "radial load" is 6300 N.

FIG. 14 illustrates how crossbar spacing could be selected for a given application. For example, in applications with high pitching moments, the crossbar spacing could be increased to reduce bearing radial loads and pitching angles at the expense of increased bearing wear and pin side translation. In this application, crossbar spacing could conceivably be increased to a value corresponding to the sheave 904 diameter, which in one aspect is twelve belt pitches. If, however, pin side translation is limited by geometrical constraints or deflection of spring washer stacks 105 or 201, a lower crossbar spacing could be selected, In applications where bearing lifetime is the highest priority, a crossbar spacing could be selected to minimize bearing wear. For the loading scenario shown in FIG. 14, the optimal range for minimizing bearing wear is approximately two to approximately three belt pitches. In one aspect of the invention, the belt can have a pitch of 32 mm and a crossbar spacing 310 of 64 mm (2 pitches). In another aspect of the invention, a smaller belt can have a pitch of 14 mm and crossbar spacing of 42 mm (3 pitches.) For belts without teeth, the crossbar spacing 310 can be similarly optimized for any variable of importance.

Operation

Figure 9:
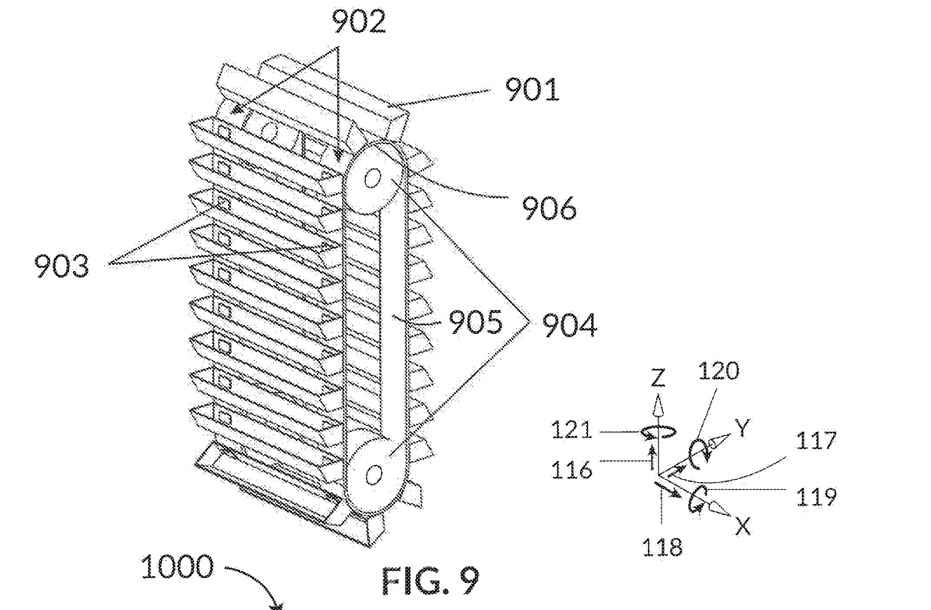
FIG. 9 is an isometric view of a parallel belt system in accordance with a fourth aspect.

The belt attachment 100 shown in FIGS. 1-6 can be used with a set of parallel belts 902 with an implement 901 supported between two belt attachments 100 at attachment points 903, as shown in FIG. 9. Various implements such as buckets or blades can be attached to the belt attachments using the threaded holes 109 in the platforms 103. Other methods of attaching implements 901 to the platforms 103 are possible such as through-bolts with nuts, brazing, welding, making the platforms and implement an integral single part, or other methods known to those skilled in the art. Depending on the application, the implement 901 can be driven by the belts 902, or the implement 901 can drive the belts 902 to produce power. In either case, loads and moments are imposed on the implements 901 that transfer to the belt 902 through the belt attachments 100.

During a typical cycle, belt attachments 100 travel over a linear portion 905 and then over a curved portion 906 as they travel over the sprockets 904. Rotational movement around sprocket 904 requires each bearing 300 to allow for a predetermined pitching rotation as well as a lift translation due to the change in straight line distance between crossbars 102 over the sprocket 904. This combined movement of bearing surfaces results in sliding contact between bearing elements, which include the pin 202, inner cylinder 203, middle cylinder 204, outer cylinder 205, and bearing cavity 209. This sliding contact results in wear. In the case of a normal bearing that is fixed to its housing, wear would occur at the same location with each cycle, resulting in rapid localized wear. However, for bearings 300, the bearing cylinders 203, 204, and 205 experience a net rotation with every cycle and thereby distribute wear evenly over all cylinder bearing surfaces: pin outer surface 311, inner cylinder inner surface 312, inner cylinder outer surface 313, middle cylinder inner surface 314, middle cylinder outer surface 315, outer cylinder inner surface 316, outer cylinder outer surface 317, and bearing cavity 209. In other words, the cylinders distribute the wear over a larger contact area leading to longer maintenance intervals. While wear is a function of force and sliding distance, it is also a function of adhesion between mating materials. Adhesive wear is caused by micro-welding and sliding induced rupture between opposing asperities on the rubbing surfaces of mating bodies. Similar materials tend to experience a greater degree of attraction and adhesion than dissimilar materials. Therefore, in one aspect of the invention, dissimilar materials can be used for adjacent parts and cylinders to reduce adhesive wear. In one aspect of the invention, adjacent parts can be formed of steel and bronze. For example, the pin 202 can be steel, the inner cylinder 203 can be bronze, the middle cylinder 204 can be steel, the outer cylinder can be bronze, and the bearing cavity 209 can be steel. In another aspect, if the pin 202, inner cylinder 203, middle cylinder 204, outer cylinder, and bearing cavity 209 are all made of steel, adhesive wear would be approximately two orders of magnitude greater than when dissimilar materials are used for adjacent parts, depending on the specific materials and whether lubricant is used between adjacent surfaces. Any bearing materials known to those skilled in the art could be used for any of the cylinders, including: steel; stainless steel; copper alloys; polymers; composites, including impregnated metals, reinforced plastics, tri-metals, and coated materials. Lubricants such as grease, oil, water, or graphite, or others could also be packed between bearings to reduce adhesive wear.

As shown in FIG. 9, it is typical during operation for lift, drag, and moment loads to be placed on implements 901 during linear travel and then for these loads to change over the sprockets 904. Lift loads result in a lift translation of the pins 202 relative to the bearing cavities 209. This causes the bearing cylinders 203, 204, and 205 to be forced against the smaller diameter portion of the bearing cavity 209 causing the cylinders 203, 204, and 205 to bend like a set of leaf springs. Because the bearing cylinders 203, 204, and 205 act like springs during lift loads, resultant impact forces are reduced. In one aspect of the belt attachment, pins 202 can be nominally situated at the center of the bearing cavity 209 with the belt 101 in a linear position, as shown in FIG. 3. This allows lift loads to be taken evenly by each of the bearings 300 during the linear portion 905. For lower lift loads, the pins 202 could be offset in opposing lift directions relative to the bearing cavities 209 to reduce lift translation during the linear travel sections. In FIG. 3, this offset configuration would have the right pin 202 offset to the right side in its bearing cavity 209 and the left pin 202 offset to the left side in its bearing cavity 209.

Lift loads on implements 901 can also result in the implement 901 bending unless it is perfectly rigid. Bending of the implement 901 manifests itself as a cocking rotation 120 of the belt attachment 100. At the bearings 300, this is seen as a side translation and cocking rotation 120. The amount of side translation is different from one pin 202 to the other pin 202 depending on where the centroid of the implement 901 is located relative to the platform 103 in the lift direction 116. Spring washer stacks 105 and 201 can be used to absorb the side translation and at the same time provide a restoring centering force. Depending on the amount of side translation expected per pin, the spring washer stacks 105 or 201 can be configured to provide a high centering force and low displacement or low centering force and high displacement. For example, spring washer stacks 105 could be made from steel and spring washer stacks 201 could be made from plastic if the pin 202 corresponding to the plastic washers 201 experiences much greater side translation than the pin 202 corresponding to the steel washers 105. The spring washer stacks 105 and 201 can also act to seal and isolate the bearings 300 from the surrounding environment. In another aspect of the invention, when the spring washer stacks 105 and 201 are not needed for their sealing or centering functions, they can be omitted. Many other types of springs could be used to provide the centering force such as other types of spring washers, regular compression springs, various types of cantilever springs, elastomeric elements or other methods known to those skilled in the art. In addition, a bonded elastomer, bellows, boot, or other method could be used to seal and isolate bearings 300 from the surrounding environment.

Figure 7:
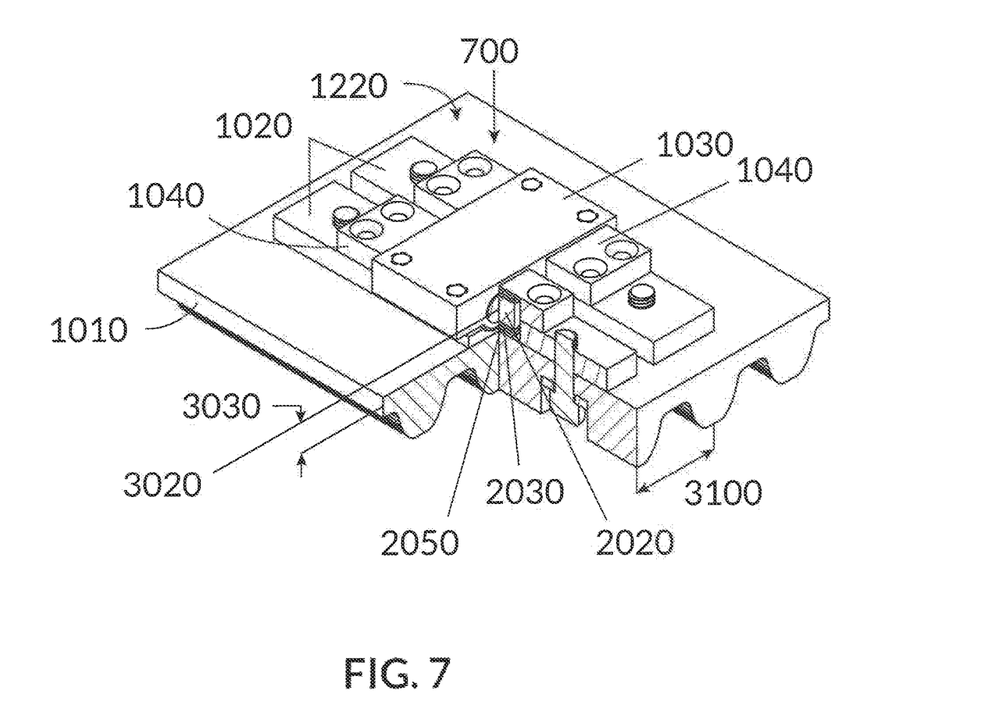
FIG. 7 is an isometric view of a belt attachment in accordance with a second aspect.

Lift loads can also result in a pitching moment 113 of the crossbar 102 relative to the belt 101. The lift load 110 will be reacted at the pin center 302. where it contacts the bearing cavity 209. In FIG. 3, the offset 303 of the pin center 302 is shown relative to the pitchline of the belt 301. As shown, the pin center 302 is coincident with the belt surface 122. Therefore, lift loads will nominally not result in a pitching moment of the crossbar 102 relative to the belt 101. This results in negligible pitching rotation of the crossbar 102 relative to the belt 101, which can lead to lower loads at this crossbar to belt interface 404 and less wear on the belt surface 122. Having the pins 202 and bearings 300 coincident with the belt surface 122 also requires a belt cutout 207. In another aspect of the invention for applications where the lift loads are lighter, the pin offset 303 can be increased so that a belt cutout 207 is no longer required. An example of this configuration is shown in FIG. 7.

A lift load on an implement 901 that is not aligned with the pin centers 302, can manifest itself as a pitching moment on the belt attachment 100 and be taken by the bearings 300 as opposing drag loads. A pitching moment on an implement 901 can also have the same result. Both of these loads will result in a pitching rotation 119 of the belt attachment 100. The amount of pitching rotation 119 can be limited by reducing the size of the bearing cavity 209 in the drag direction 117 or by increasing the spacing 310 between crossbars 102.

Drag loads on implements can result in rolling rotation 121 and side translation of the belt attachments 100. Side translation will result in a side translation of the pins 202 relative to the bearing cavities 209, This translation can be unconstrained or can be absorbed by spring washer stacks 105 and 201. Rolling rotation of the pins 202 relative to the bearing cavities 209 can be unconstrained until gaps 304, 305, 306, and 307 are reduced to zero on either side of the cylinders 203, 204, and 205.

In the conveyor system shown in FIG. 9, implements 901 are perpendicular to parallel belts 902. If implements 901 are not perfectly perpendicular to the parallel belts 902, during operation, one belt attachment 100 will enter the curved section 906 slightly ahead of the parallel belt attachment 100 as a result of windup between parallel sprockets 904 or assembly tolerances. For the bearings 300, this can result in a drag translation of pins 202 relative to bearing cavities 209. Unless the implement 901 is compliant in the twist direction, large bearing forces could result, causing increased wear and eventual failure. Additionally, gaps 304, 305. 306, and 307 can be made large enough to accommodate any anticipated twist due to windup or tolerances. In one example, a windup of 1.6 degrees causes a drag translation of 0.45 mm. If the total gap distance resulting from the addition of gaps 304, 305, 306, and 307 is equal to or greater than 0.45 mm, bearing forces due to windup are eliminated. In the aspect shown in FIG. 3, each of the three gaps 304, 305, and 306 are nominally 0.1 mm with gap 307 being absent in the drag direction. If in this aspect the drag translation caused by windup is 0.45 mm, the additional 0.15 mm is taken up by compliance of implement 901 in twist.

The aspect of the belt attachment as described and shown in FIGS. 1-6 does not substantially constrain cocking rotations, rolling rotations, or side translations. This results in simple support constraints of the attached implement 901 at the two belt attachments points 903. Simple supports are well known beam constraints that allow rotations and therefore do not transfer moments. These simple constraints are coincident with the mid-span of the belt 902 in the side direction 118 and the belt surface 122 in the drag direction 117. The constraints therefore provide for an evenly distributed force along the width of the belt 902 and minimal transfer of moments to the belt 902. Belt 902 and belt attachment 100 fatigue lifetimes can therefore be substantially increased over prior art designs. At loads corresponding to the maximum rated belt power for a given belt speed, fatigue lifetimes of the belt and entire belt attachment have been observed to reach several tens of millions of cycles without failure.

Figure 10:
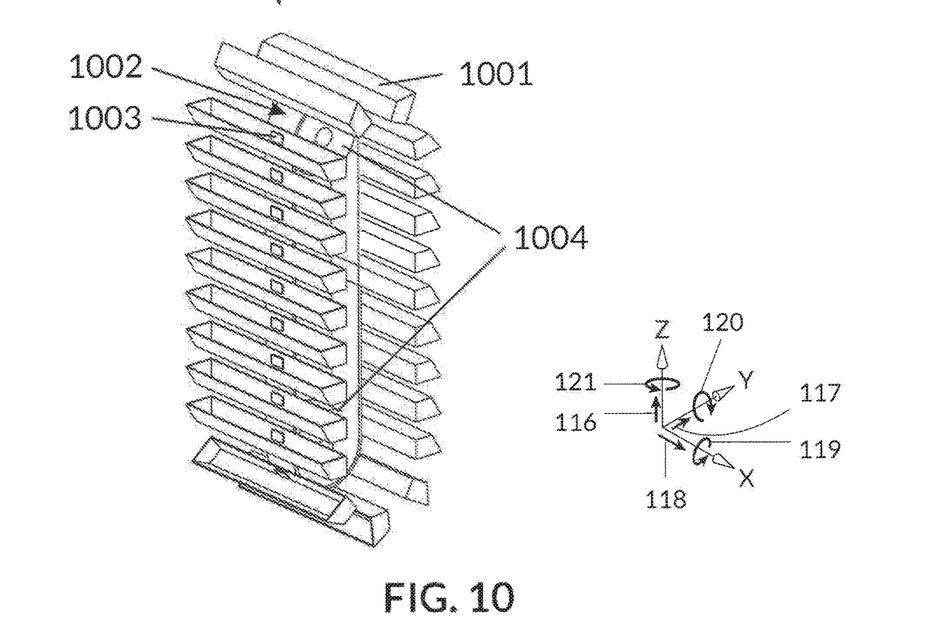
FIG. 10 is an isometric view of a single belt conveyance system in accordance with a fifth aspect.
Figure 12:
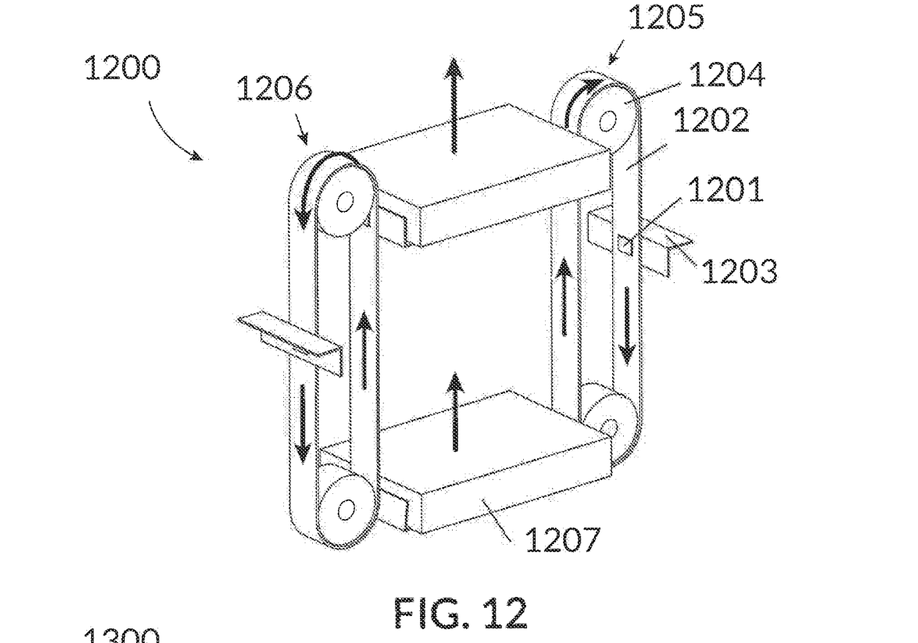
FIG. 12 is an isometric view of a dual belt conveyance system in accordance with a sixth aspect.
Figure 13:
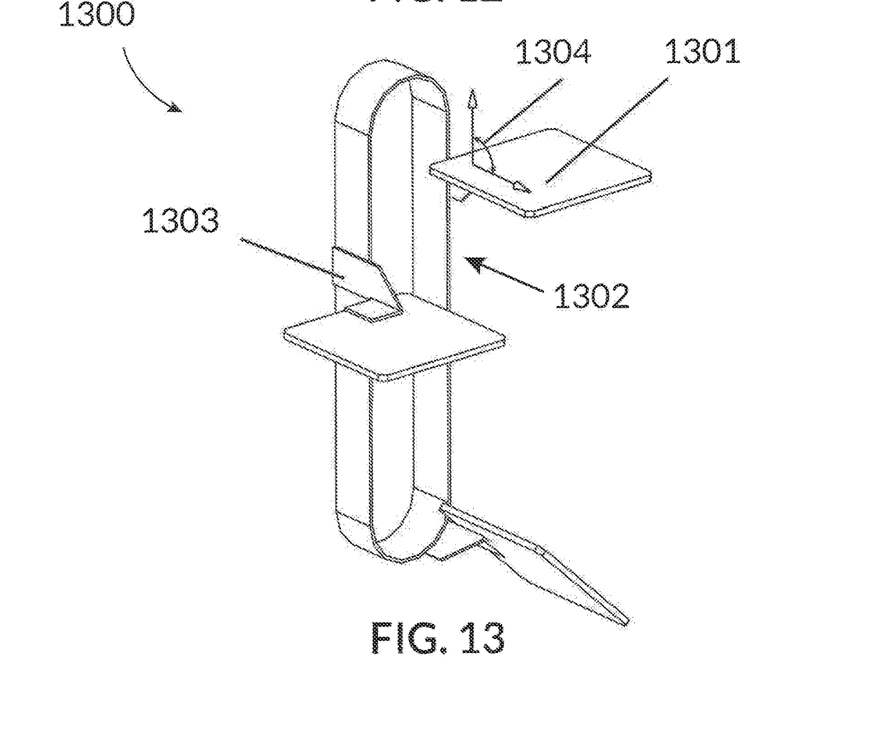
FIG. 13 is an isometric view of a belt conveyance system in accordance with a seventh aspect.

In another aspect of the invention, belt attachment 700, shown in FIG. 7, is designed to resist cocking 114 and rolling moments 115 in addition to pitching moments 113. Belt attachment 700 accomplishes these additional restraints through placement of the bearing inner and outer cylinders 2030 and 2050 at the ends of the pins 2020. The bearing caps 1040 are split and put at the ends of the pins 2020. The platform 1030 is a single part and is placed at the center of the attachment 700. In certain applications, belt attachment 700 can support loads in certain orientations, such as cantilevered loads, for example as shown in FIG. 13. Belt attachment 700 can also provide additional cocking stability for a centrally-supported configuration, for example, as shown in FIGS. 10 and 12.

FIG. 7 also includes several other aspects of the invention. For example, belt 1010 in FIG. 7 does not include cutouts, as all of the attachment system 700 is located above the back of belt 1010. This design preserves the tensile reinforcements in belt 1010, and reduces manufacturing steps. However, belt attachment 700 is preferable for lower load cases where the resulting moment between crossbar 1020 and belt surface 1220 is acceptable. This moment is caused by pin offset 3030 in FIG. 7 being greater than pin offset 303 shown in FIG. 3. The pin offset 303 results in zero moment because pin center 302 is coincident with belt surface 122. Any pin offset 3030 that is greater than this, i.e. pin center 3020 is offset from belt surface 1220, will result in a non-zero moment and relative pitching rotation between crossbar 1020 and belt surface 1220. The architecture shown in FIG. 7 is possible if the lift loads 110 are low enough or the fatigue cycles are low enough to prevent unwanted belt wear caused by the relative pitching rotation described above. Additionally the attachment 700 illustrated in FIG. 7 utilizes a smaller spacing 3100 between crossbars 1020. In this aspect, the crossbar spacing is one belt pitch or 32 mm. This compact spacing reduces the motions undertaken by the bearing components as the system articulates over a sprocket or sheave, but allows for greater implement pitching rotation.

Figure 8:
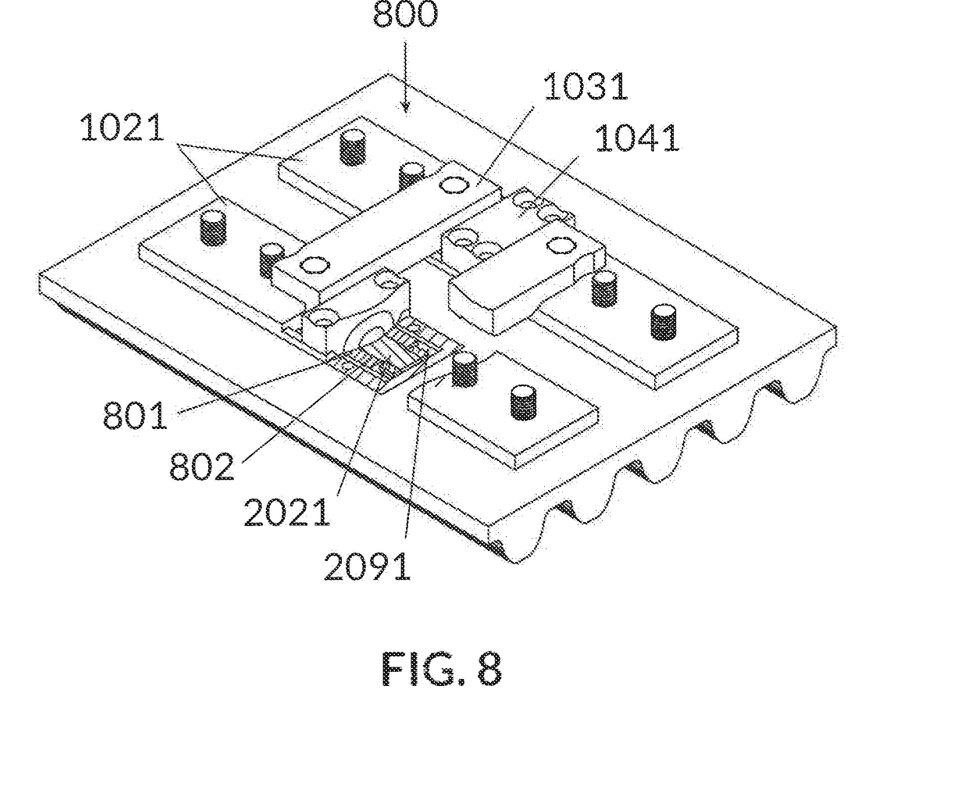
FIG. 8 is an isometric view of a belt attachment in accordance with a third aspect.

FIG. 8 illustrates another belt attachment 800 in accordance with the present invention. This aspect is very similar to belt attachment 100 in FIGS. 1-6, with the main difference being the use of a different type of bearing. Rather than utilizing bushing roller bearings 300, the bearing 802 illustrated in FIG. 8 is an elastomeric bearing 802. Bearing 802 has a rigid interior 2021 and exterior cavity 2091 joined together by a bonded elastomer 801. Exterior cavity 2091 is comprised of matching substantially cylindrical cavities in crossbar 1021 and beating cap 1041. In one aspect, bonded elastomer 801 includes concentric laminae comprising alternating strata of elastomeric materials and rigid materials. In another aspect, the number of laminae, materials of composition of each laminae, and relative proportions of the laminae can be altered. Additionally, the laminae can be composed of continuous, or interrupted, segments, as may best fit the intended use, without deviating from the intent of this belt attachment. The elastomeric bearing may be designed in a number of ways, with the elastomeric members performing a combination of functions including sealing of the rigid concentric members, provision of stability, and/or load carrying capabilities. The elastomeric bearing design can be further optimized to allow for different spring rates in the lift, drag, and translation directions. Rigid concentric members consisting of fully cylindrical or partial arc sections can be added or subtracted to increase or decrease stiffness, respectively, in various directions.

Description of Conveyor Systems

An aspect of a conveyor system 900 is shown in FIG. 9. In this aspect, a plurality of implements 901 are attached at attachment points 903 to a pair of belt assemblies 902 arranged in a parallel manner. The belts, and the attachment points 903, are spaced apart from each other. The belts operate over sprockets 904. The implements 901 spanning the two belts 902 can take any of a wide variety of forms depending upon the anticipated use of the resulting system. For example, the implement 901 could instead be a rake, for use in a trash rack cleaning device; a platform or a specialized component for use in a conveyance device; a bar for use in a bulk-materials moving machine; and an aero- or hydrodynamic profile for use in a kinetic energy conversion device, such as a turbine or a fan. In all of these aspects, and others which will be clear to those practiced in the art, the loads on the implement (lift loads, drag loads, and moments) are passed into the belts 902 through the belt attachments (e.g. belt attachment 100) of the subject invention, and the resulting strains due to mechanical deformation under stress are borne by the belt attachments (e.g. belt attachment 100). The machine described in this aspect may not require both sets of sprockets 904 illustrated. For example, it may be desirable to build a similar machine using one upper axle with two sprockets. This type of arrangement could find use as a trash rack for water intakes, for example, where it is desirable to reduce the number of submerged components in the machine.

An additional aspect of a conveyor system 1000 is shown in the machine illustrated in FIG. 10. In this aspect, a plurality of implements 1001 are attached at attachment points 1003 to a single belt assembly 1002. The implement 1001 can take a wide variety of forms in the same manner as described in FIG. in this aspect, it may be desirable for the implement or alternate implement to remain at a specific angle relative to the vector of belt travel as shown in FIG. 10 as a rotation 120 about the Y axis. The implements 1001 illustrated in FIG. 10 are orientated perpendicular to the vector of belt travel. In other applications, this angle may be any arbitrary value, as dictated by the intended use. For example, in a bulk transport device designed to move materials or fluids from one side of the machine to the other along the X axis, the implements could be attached at an acute angle, such as 45 degrees, relative to the vector of belt travel, by rotation about the attachment Y-axis. To help restrain cocking rotations, belt attachment system 700 can be used, as shown in FIG. 7. A benefit of belt attachment system 700 is the simplification of the system by reducing quantity of components required to accomplish the stabilization of the implement 1001 while undergoing motion. For example, typical conveying machines require many additional components such as complex systems of rollers, bearings, guide rails, and supporting framing, to stabilize the load in a recirculating conveyor platform. Many of these complex systems could be eliminated by the incorporation of the belt attachment system (e.g. belt attachment 700), since it can inherently provide stability in multiple axes, while also withstanding large loads and high fatigue cycles.

Figure 11:
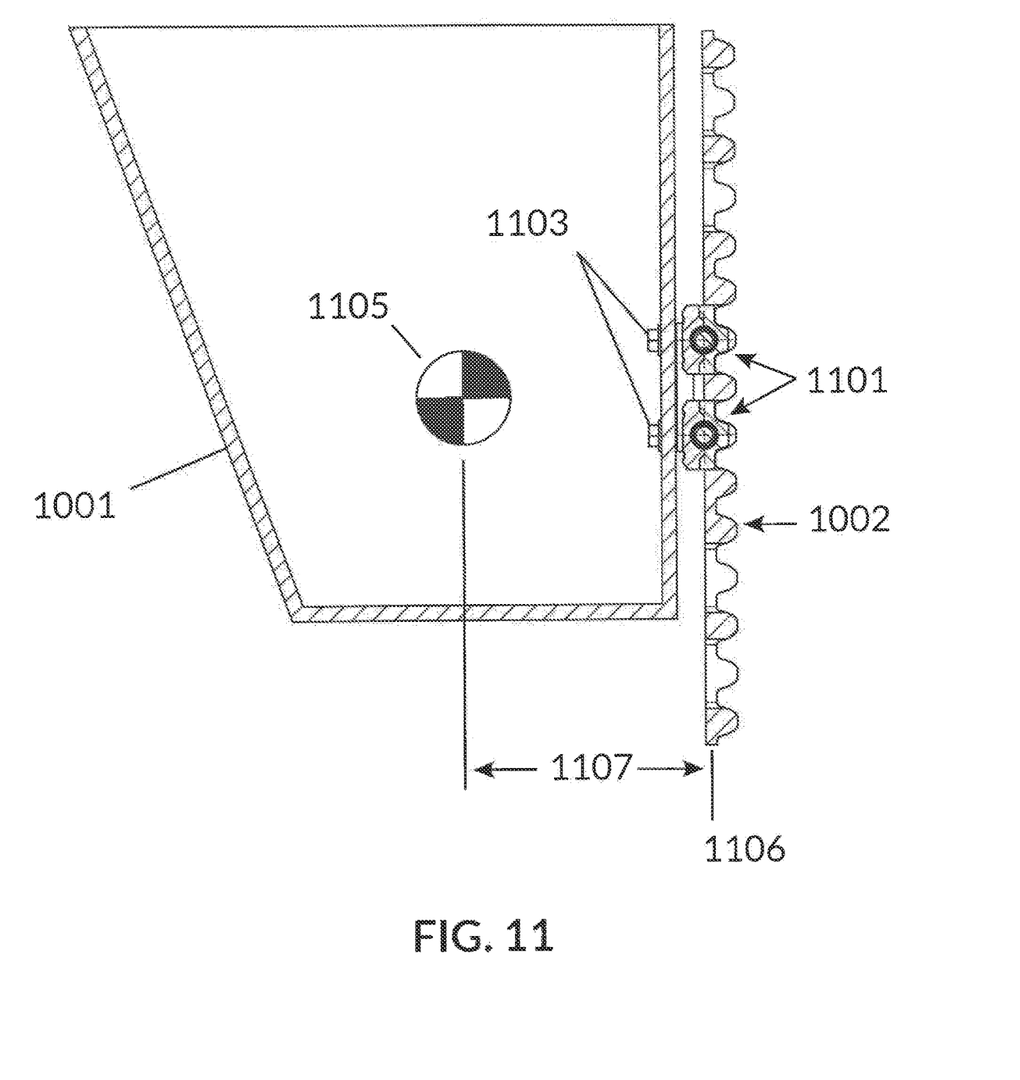
FIG. 11 is a detail section view of the aspects shown in FIG.'S. 9 and 10.

FIG. 11 is a detailed cross-sectional view of the implement 1001 and conveyor system 1000 illustrated in FIG. 10. An implement 1001 is attached with bolts 1103 to the belt attachment 1101, which communicates loads to the belt assembly 1002. The shape of the implement 1001 is largely irrelevant; as mentioned previously this component can be any load-bearing implement as dictated by the intended application. The payload will have a center of mass 1105 positioned at a distance 1107 from the belt pitchline 1106, causing a pitching moment about the belt 1002. The distance 1107 may be in the direction illustrated, but it may also be zero (coincident), or it may lie on the opposite side of the belt 1002. Any of these examples will result in some value (including zero) of pitching moment which the belt attachment 1101 must resist. Additionally, dynamic operation may cause moments and loads different from static operation. High pitching moments or pitching rotations could be further accommodated by moving the crossbars 102 of the belt attachment 1101 farther apart on the belt in the lift direction (refer to spacing 310).

Another aspect of a conveyor system 1200 is shown in FIG. 12. A plurality of load-bearing implements 1203 are attached to the belt assembly 1202 by a plurality of attachment points 1201. The belt assembly 1202 operates around a plurality of sprockets 1204. These components, combined with structural support components such as bearings and frame components not shown, comprise a module 1205. Pairs of these modules, such as 1205 and 1206, operate in an opposed manner to move a plurality of payloads 1207 from one elevation to another. Motions of the system are indicated by the arrows. More than one pair of modules may be configured. In another aspect of the invention, instead of one pair of modules, there could be two or more pairs. These alternate configurations may be desirable to provide for larger load capacity or greater stability, for example. The means of conveyance of the payload 1207 into and out of communication with the lift modules 1205 and 1206 may be accomplished with a large number of possible options, such as conveyor belts or other systems familiar to one skilled in the art of materials conveyance.

Another aspect of a conveyor system 1300 is illustrated in FIG. 13. In this aspect, a load-bearing platform 1301 is cantilevered off of a belt system 1302, The connection between the platform and the belt is provided at the attachment point 1303. This aspect utilizes the ability of conveyor system 1300 to react to the resulting cantilever moment while providing a load bearing surface 1301 orientated at a stable angle 1304 relative to the belt. To help restrain cocking rotations, belt attachment system 700 can be used, as shown in FIG. 7. The platform illustrated is perpendicular to the belt, but the angle 1304 may be fixed at any arbitrary angle that may be desirable for the intended use. Similar to the discussion for FIG. 10, a different angle 1304 may be desirable to transferring materials or fluids in a certain direction. The platform illustrated may also take the form of any load-bearing component or system, such as an aero- or hydro-dynamic foil for use in an energy-conversion system such as a fan or turbine; any desired shape for use in a material mixing or stirring application; a platform to convey loads from one elevation to another; or any other such aspect as may be apparent to one skilled in the art.

What is claimed is:

1. A belt assembly, comprising:
   a flexible belt having a first surface and a second surface; and
   a crossbar attached to the first surface and spanning a portion of a width of the belt, wherein the crossbar defines a plurality of apertures for receiving fasteners, such that the crossbar is attached to the flexible belt via the fasteners, the crossbar further including:
   a plurality of spikes integrally formed with the crossbar and positioned in the vicinity of an aperture of the plurality of apertures to engage the first surface of the belt, such that the spikes restrain relative motion between the crossbar and the belt.

2. The belt assembly of claim 1, wherein the spikes are substantially pyramidal shaped.

3. The belt assembly of claim 1, further comprising a reinforcing tensile member within the flexible belt.

4. The belt assembly of claim 3, wherein one of the plurality of spikes engages the tensile member.

5. The belt assembly of claim 1, further comprising:
   an implement coupled to the belt assembly through the crossbar.

6. The belt assembly of claim 5, wherein the implement is arranged perpendicular to the flexible belt.

7. The belt assembly of claim 5, wherein the implement is a bucket or a blade.

8. The belt assembly of claim 1, wherein the belt is a positive drive belt, a flat belt, or a V-belt.

9. The belt assembly of claim 1, wherein the belt comprises one or more of polyurethane, rubber, and neoprene.

10. A belt assembly, comprising:
    a flexible belt having a first surface and a second surface;
    a crossbar attached to the first surface and spanning a portion of a width of the belt, wherein the crossbar defines a plurality of apertures for receiving fasteners for attaching the crossbar to the belt, and wherein the crossbar comprises a plurality of spikes configured to engage the first surface of the belt, such that the spikes restrain relative motion between the crossbar and the belt; and
    an implement coupled to the belt assembly through the crossbar.

* * * * *